Patented Oct. 24, 1933

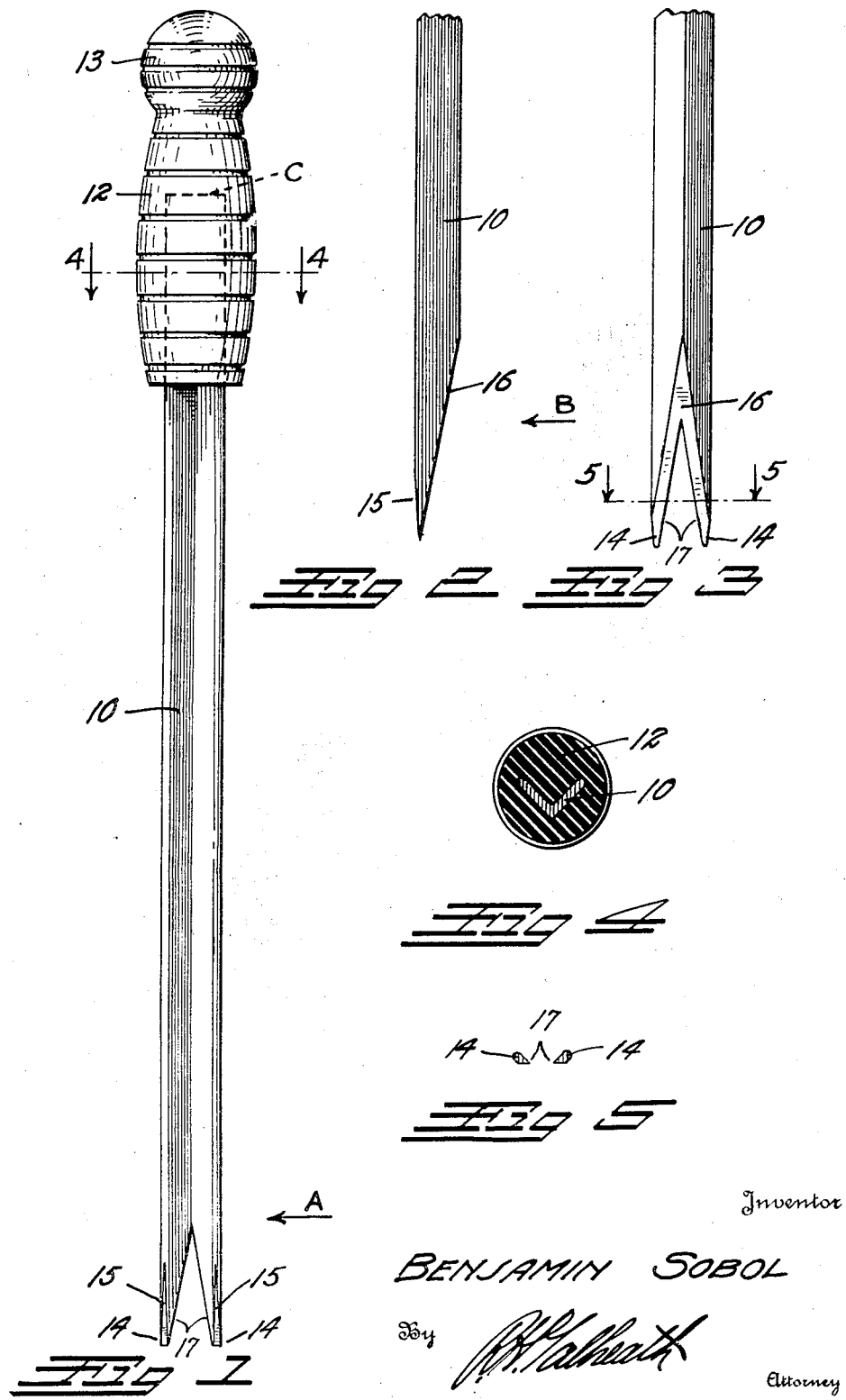

1,931,773

UNITED STATES PATENT OFFICE 1,931,773

DANDELION DIGGER

Benjamin Sobol, Denver, Colo.

Application January 19, 1933. Serial No. 652,456

6 Claims. (Cl. 55—65)

This invention relates to a digger, and while more particularly intended as a digger for dandelions and other noxious weeds, it will be found valuable for many other uses such as transplanting small plants, etc.

The principal object of this invention is to provide a highly efficient tool which will loosen and remove the root of the dandelion in its entirety.

Another object of the invention is to provide a digger which can be very economically manufactured without the use of special forming dies so that it can be manufactured at a comparatively low cost.

A further object of the invention is to provide a resilient handle for a tool of this character which will not tire or blister or callouse the hand; which will not become loosened from the shank; and which will not become roughened or split from weather conditions.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front elevation of the improved digger.

Fig. 2 is a detail view of the digging extremity thereof looking in the direction of the arrow A, Fig. 1.

Fig. 3 is a similar detail view looking in the direction of the arrow "B", Fig. 2.

Fig. 4 is a detail cross section taken on the line 4—4, Fig. 1.

Fig. 5 is a detail cross section taken on the line 5—5, Fig. 3.

The improved digger comprises: a shank 10, L-shaped in cross section and formed from a single piece of standard angle iron, preferably ½"×½". The shank 10 is forced into a molded rubber handle 12, there being an L-shaped slot molded into the handle 12 for the reception of the shank 10. It is preferred to form the slot in the handle slightly smaller in size than the shank so that the latter, when forced into the handle will be securely locked therein by the inherent elasticity of the rubber.

It will be noted that the shank does not extend the full length of the handle 12, as shown in broken line at "C" in Fig. 1. This allows a certain flexibility to the upper portion of the handle which acts as a cushion for the hand, and eliminates fatigue. The top of the handle is molded with a ball-shaped protuberance 13, which in use fits snugly within the palm of the hand so as to make a comfortable rest therefor.

It is desired to call particular attention to the forming of the digging extremity of the shank 10. The shank terminates in two sharp spaced apart points 14 which are similarly formed by simply cutting the angle iron, of which the shank is composed, with a slanting or beveled cut which extends from the edges of the angle toward the handle so as to form an apex at the rear corner of the shank 10, as shown more particularly in Figs. 2 and 3. This beveled cut results in a beveled face 16 on the digging extremity. Ordinarily to obtain a V-shaped point of this character, it would be necessary to have special blanking and bending dyes. With the use of an angle iron shank, however, a simple angle cut automatically forms the desired extremity. Should sharper points be desired, a slight additional bevel may be ground on the two front edges of the shank as shown at 15.

In use, the device is vertically inserted with the root of the dandelion in the concavity formed by the angle iron shank. The digger is then slightly rotated to cause the shank to pass around the root and loosen the dirt on all sides so that it may be lifted from the ground and removed in its entirety.

It has been found that the natural abrasive action of the ground upon the beveled face 16 will constantly keep the digger sharp while in use. If this is not sufficient to keep it sharp, both the points can be sharpened by simply rubbing the beveled face 16 upon a sidewalk or similar abrasive substance. The tool can be constantly re-sharpened in this manner until the entire shank is worn away, so that it will last practically forever. The L-shape of the shank, besides forming a blade which will partially surround the dandelion root also acts to stiffen and prevent bending of the blade.

It will be noted that the beveled face 16 intersects the inner face of the angle shank so as to form a sharp edge 17 along the inner face of the V-shaped notch. This makes an excellent cutting knife for cutting tough roots, branches etc.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A dandelion digger comprising: a handle; a shank inserted in said handle, said shank having an L-shaped cross section so that it will enclose the root of said dandelion, the edges of said L-shaped shank terminating in spaced-apart, pointed extremities.

2. A dandelion digger comprising: a handle; a shank inserted in said handle, said shank having an L-shaped cross section so that it will enclose the root of said dandelion; and a beveled lower extremity on said shank, said bevel extending from the apex of said L-shaped shank forwardly at an angle so as to terminate at the two edges thereof in two pointed extremities.

3. A dandelion digger comprising: a handle; a shank inserted in said handle, said shank having an L-shaped cross section so that it will enclose the root of said dandelion; and a beveled lower extremity on said shank, said bevelled extremity extending from the apex of said L-shaped shank forwardly at an angle so as to terminate at the two edges thereof in two pointed extremities; and a second beveled face on each of said edges extending to said pointed extremities.

4. A dandelion digger comprising: a handle; a shank inserted in said handle, said shank having an L-shaped cross section so that it will enclose the root of said dandelion, said handle being molded of rubber and extending beyond said shank a sufficient distance to allow it to bend and flex.

5. A dandelion digger comprising: a handle; a shank inserted in said handle, said shank having an L-shaped cross section so that it will enclose the root of said dandelion, said handle being molded of rubber; and an L-shaped pocket formed in said handle to receive said L-shaped shank.

6. A digging tool comprising an angle iron shank; a beveled face formed on one extremity of said shank, said beveled face extending from the apex of said shank toward the extremities of the edges thereof so as to leave a V-shaped notch in said one extremity; and sharp edges outlining said V-shaped notch.

BENJAMIN SOBOL.